R. SANDERSON.
METHOD OF AND APPARATUS FOR MAKING RUBBER NIPPLES.
APPLICATION FILED AUG. 30, 1921.
1,420,287. Patented June 20, 1922.
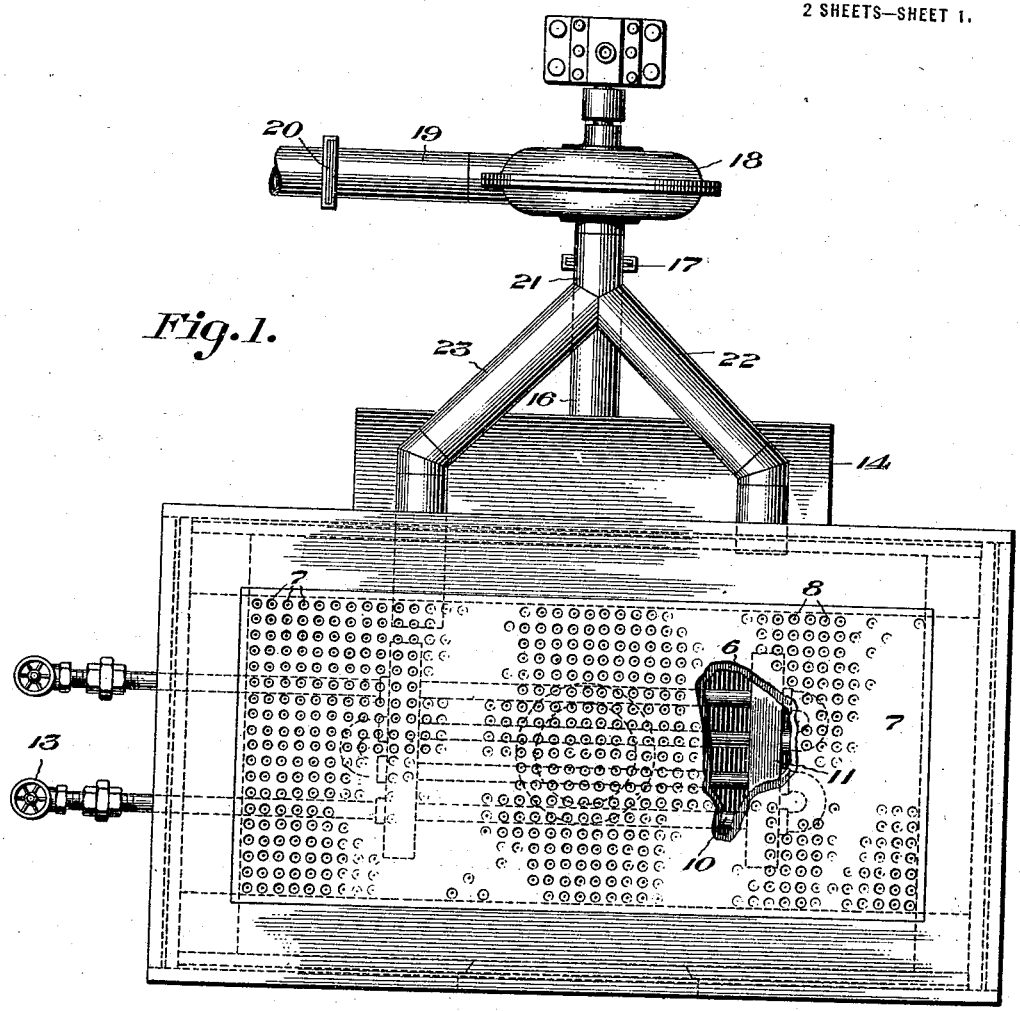
Fig. 1.
Fig. 2.
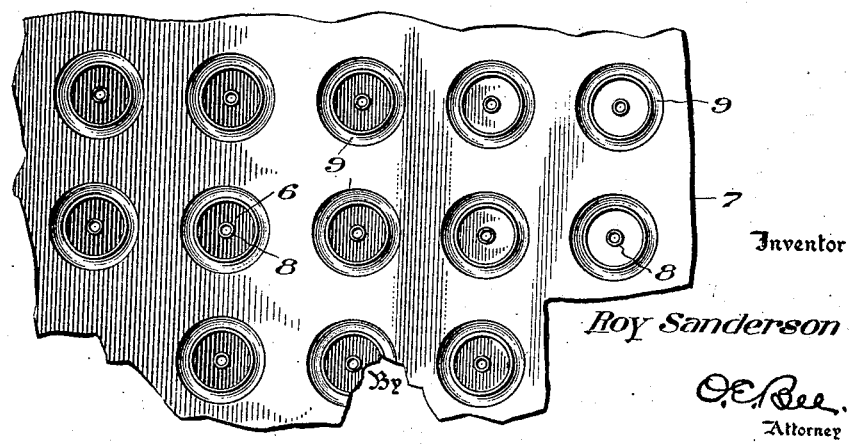
Inventor
Roy Sanderson
Attorney R. SANDERSON.
METHOD OF AND APPARATUS FOR MAKING RUBBER NIPPLES.
APPLICATION FILED AUG. 30, 1921.

1,420,287.

Patented June 20, 1922.

Inventor
Roy Sanderson

O.E.Bee.
Attorney

UNITED STATES PATENT OFFICE.

ROY SANDERSON, OF KENMORE, OHIO.

METHOD OF AND APPARATUS FOR MAKING RUBBER NIPPLES.

1,420,287. Specification of Letters Patent. Patented June 20, 1922.

Application filed August 30, 1921. Serial No. 496,809.

*To all whom it may concern:*

Be it known that I, ROY SANDERSON, a citizen of the United States, and resident of Kenmore, Ohio, have invented new and useful Improvements in Methods of and Apparatus for Making Rubber Nipples, of which the following is a specification.

My invention relates to the manufacture of rubber articles, with particular reference to the construction of rubber nipples of the transparent type, and it has, for its primary object, the provision of an apparatus for manufacturing articles of the above designated character in an efficient and advantageous manner.

Heretofore, the sale of rubber nipples, particularly those of the transparent type, has been greatly limited by reason of the fact that the interior of such articles were not so cured during their manufacture as to obviate a tackiness of the interior surface, which, of course, detracts from their properly functioning. One object of my invention resides in so curing the interior surface of rubber nipples as to obviate any tendency to become tacky or sticky.

Nipples of the above designated character have been manufactured, heretofore, by utilizing methods which caused overcuring of the nipple ring, which consequently resulted in premature aging or cracking of the rubber in this portion of the nipple. Obviously, premature aging or cracking of the nipple ring causes it to lose its inherent resiliency, and as a result its usefulness is materially affected.

Another object of my invention is to provide a method of and apparatus for curing rubber nipples which shall insure that all portions of the rubber shall be properly cured, and that the inherent characteristics of the rubber shall be retained.

One of the outstanding features of a nipple of the transparent type, particularly as a selling point, is the fact that they not only appear more sanitary than other types, but also that they may be easily inspected for the deposition of foreign matter and readily cleaned. If the nipples possess an interior surface which is slightly tacky or sticky, one of the main advantages of this type of nipple is consequently lost, and it is an object of my invention to so treat such nipples as to produce an entirely sanitary article which may be readily cleaned and inspected throughout the duration of its usefulness.

With these and other objects in view, my invention will be more fully described, illustrated in the drawings, and then fully pointed out in the appended claims.

Referring to the drawings:

Fig. 1 is a top plan view of apparatus which may be utilized in curing nipples in accordance with my invention;

Fig. 2 is a detail view, on a larger scale, of a portion of a nipple supporting plate, which is embodied in the apparatus shown in Fig. 1;

Figure 3:
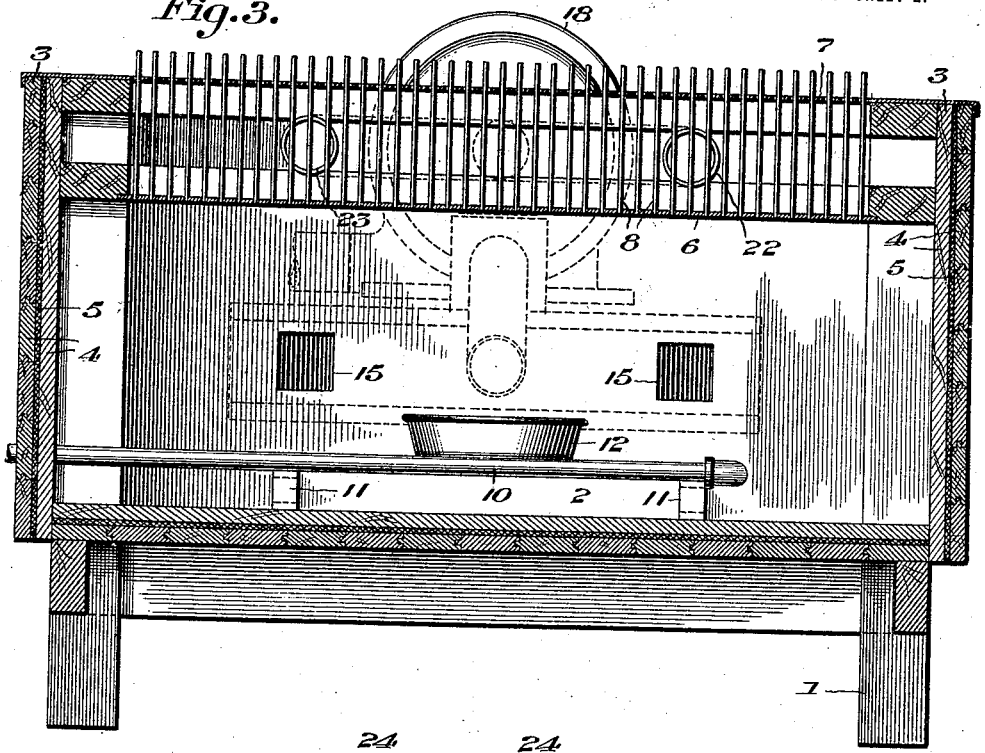
Fig. 3 is a transverse sectional view of the apparatus shown in Fig. 1.

My invention is mainly concerned with the manner of curing the interior of rubber nipples of the transparent type and with providing apparatus suitable for practicing the method. The prevalent practice, heretofore, has been to cure the nipples by dipping, or otherwise immersing, them in liquid curing agents, such as sulfur chloride ($S_2Cl_2$). The nipples were ordinarily formed upon a suitably shaped form, and the exterior of the rubber was then cured, which was accomplished, heretofore, by dipping or otherwise bringing the rubber into intimate association with the curing agent, after which the nipples were stripped from the forms. The interior surfaces of the formed articles were then subjected to the action of a curing agent.

It will be appreciated that if the dipping method or liquid engagement with the rubber is utilized to cure the rubber, at least a portion thereof, usually the nipple ring, is subjected to a double cure, and this ordinarily results in over-curing that portion of the nipple, which materially detracts from its usefulness. Furthermore, the methods utilized heretofore in curing the interior of such rubber articles has not resulted in a product which met with approval on account of the fact that the interior surface is almost invariably tacky or sticky. It is not necessary to advance reasons for this tackiness of the interior of the nipple, but it is pointed out that my invention is primarily concerned with obviating this condition.

In practicing my method of curing rubber nipples, the nipple is formed by dipping a suitably shaped structure, such as an aluminum form or mandrel, properly shaped, into a vat or tank containing a good quality rubber in solution. The rubber is deposited upon the form and the dipping is continued until a suitable thickness and uniform coating is obtained. The lower portion of the rubber is then rolled to form the nipple ring, and the exterior surface of the rubber is subjected to the action of a curing agent, such as vaporized sulfur chloride. Of course, other curing agents may be utilized without departing from my invention, but I have found that sulfur chloride is very satisfactory for the purpose. After the exterior of the nipple has been thoroughly cured, it is disposed upon a suitable apparatus in which sulfur chloride is vaporized and led to the interior surface of the nipple, which has not been subjected to a vulcanizing action.

I have found that, by subjecting the interior of the nipple to the curing action of a vapor of sulfur chloride, a dry, durable surface may be obtained, and that the previously cured parts of the nipple may be easily protected from the effects of over-curing.

In order to insure a clear understanding of my invention, reference may be had to the drawings in which apparatus is disclosed for facilitating the practicing of my process. Since my invention is not primarily concerned with the formation of the nipples, this part of the operation, necessary to complete the nipple construction, will not be described in detail. It is believed sufficient to state that the nipples are formed, as in ordinary practice, by depositing a coating of uncured rubber of suitable thickness upon a nipple form, after which the lower portion of the coating is rolled, or otherwise manipulated, to provide a bead or nipple ring at the bottom thereof. The nipple may then be subjected to the curing action of sulfur chloride, preferably in vapor form, to cure such portions of it as are exposed while still upon its form. The above operation will, of course, complete the formation of a nipple up to the curing of the interior, with which my invention is particularly concerned.

Figure 4:
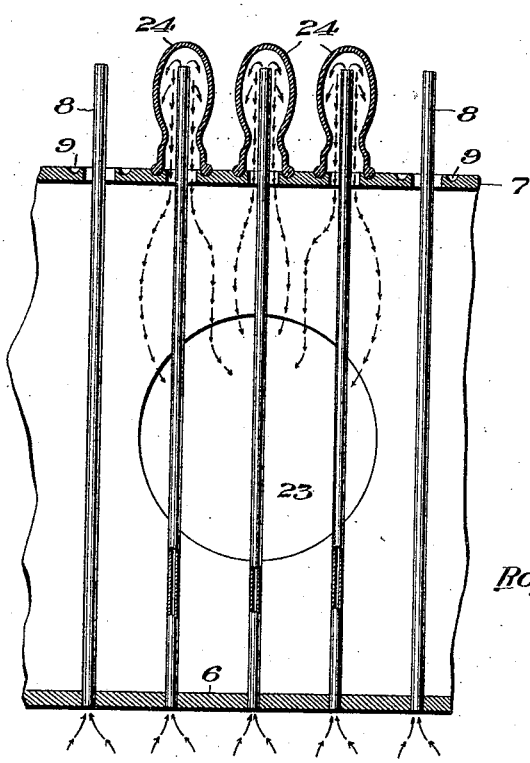
Fig. 4 is another detail view, partially in elevation and partially in section, illustrating the manner of supporting nipples and of leading a curing agent to the interior thereof.

In Figs. 1 to 4, inclusive, of the drawings, apparatus is shown comprising a base 1 upon which a heating chamber 2 is built, which is preferably formed of walls 3 made of a plurality of wooden partitions 4 separated by an asbestos filling material 5. The walls are thus formed to insure the provision of an air-tight chamber, which is essential to the efficient operation of the apparatus. The top of the chamber is closed by a plurality of metallic plates 6 and 7, preferably of aluminum, provided with a plurality of aligned openings into which conduits 8 are fitted. The openings in the top plate 7 are of such diameter as to receive the pipes or conduits 8 and permit of their being spaced from the plate 7. The openings in the lower plate 6 are of such diameter that the pipes 8 fit snugly therein so as to be rigidly supported by the plate 6. The upper plate 7 is also provided with grooves 9 which surround the various openings in the plate, the purpose of which will be hereinafter apparent.

Heating pipes 10 are suitably supported within the chamber, as indicated at 11, and upon which a container 12 may be disposed to provide means for vaporizing a liquid curing agent. The pipes 10 are, of course, provided with suitable valves 13 to control the heating means, which in this instance is steam or hot water. It will be appreciated, of course, that other heating means may be utilized to a good advantage in the apparatus, steam coils being shown only as illustrative.

At one side of the heating chamber a rectangular box 14 is mounted, which communicates with the heating chamber by means of openings 15 provided in the heating chamber adjacent the respective ends of the box. A conduit, or pipe 16, having a gate valve 17, provides a communicating passage between the box 14 and a suction fan, contained within a casing 18, that is driven by any suitable means, not shown. The casing 18 has a communicating passage to the atmosphere comprising a conduit 19 also provided with a gate valve 20. Another pipe, or conduit, 21 is connected to the casing and has a plurality of branch pipes 22 and 23, which are connected to the vaporizing apparatus at the top thereof, preferably between the closing top plates 6 and 7, as indicated in the drawings.

The purpose of the fan is to create a circulation of the vaporized curing agent which is, as above mentioned, preferably sulfur chloride, and to effect an admixing thereof with the air contained in the chamber. The circulation of the vapors is effected by causing them to be exhausted through the pipes 21 and 22, by means of the fan, and through the pipe 16 into the box 14. On account of the inlet to the box from the fan being spaced from the inlet openings 15 to the heating chamber, the circulating fluid is dispersed and a more gentle circulation is obtained. The fan is merely utilized to cause a circulation of the vapor, and is not intended, nor designed, to accomplish a very rapid circulation of the curing fluid. As the sulfur chloride, or other curing liquid, is vaporized by transmission of heat from the heating coils 10, it, of course, rises to the top of the chamber and passes through the conduits 8 into nipples 24, which are disposed upon the plate 7 surrounding the projecting ends of the pipes 8 and seating in the grooves 9.

It will be appreciated that when the exterior of the nipples 24 are cured, the portion of the bead ring, or nipple ring, seating in the grooves 9 are cured and are protected from a double cure by reason of being seated in the grooves and thus protected from the action of the vapors admitted to the interior of the nipples. As the sulfur chloride is vaporized and rises through the conduits 8 to the interior of the nipples, the air that may be contained therein is displaced and, consequently, a partial vacuum is created, which causes the nipples to be firmly seated on the plate 7, but the vacuum is not of such degree as to cause the nipples to be flexed inwardly to any material extent.

The valves provided in the conduits 16 and 19 are for the purpose of facilitating the exhausting of the chamber of its vapors, and for shutting off the air supply, or controlling it to any desired extent, during the operating of the process. For example, during the operation of the process, the valve 20 is ordinarily maintained closed, while the valve 17 is open, but if it is desired to discontinue the process for a period of time, the valve 17 is closed and the valve 20 is opened, while the fan exhausts the chamber to the atmosphere through the pipes 22, 23, 21 and 19, as will be clearly understood.

Since moisture contained in the air assists in the formation of hydrochloric acid by reaction with the sulfur chloride, calcium chloride may be disposed in the pipe 19 and the air supply may thus be subjected to a drying action, if desired. This drying of the air supply might readily be accomplished by disposing a suitable covering upon the top of the apparatus and the air exhausted by means of the fan. The air then permitted to enter the apparatus may have its moisture removed. This precautionary measure is not ordinarily necessary because there is not usually sufficient hydrochloric acid formed to seriously affect the rubber of the nipples.

Although I have shown and specifically described a method of and apparatus for manufacturing rubber nipples, it is obvious that minor changes may be made in the construction of the apparatus and in the manner of practicing the method without departing from the spirit or scope of my invention, and I desire, therefore, that no limitations shall be imposed except such as are indicated in the appended claims.

What I claim is:

1. A method of vulcanizing rubber nipples that comprises subjecting the interior thereof to the action of a vaporized vulcanizing agent.

2. A method of vulcanizing rubber nipples that comprises subjecting the interior thereof to the action of vaporized sulfur chloride.

3. A method of manufacturing rubber nipples that comprises forming the nipples, vulcanizing the exterior thereof and vulcanizing the interior thereof by effecting an intimate association of the rubber with a vaporized curing agent.

4. A method of manufacturing rubber nipples that comprises forming a nipple upon a form, subjecting it to the action of a vaporized curing agent while on the form, stripping the nipple from the form, and admitting vaporized sulfur chloride to only the interior thereof.

5. A method of manufacturing rubber nipples that comprises forming the nipple, curing the exterior thereof, and vulcanizing the interior by effecting a circulation of a mixture of vaporized sulfur chloride and air through the interior of the nipple.

6. A method of manufacturing rubber nipples that comprises forming the nipple, curing the exterior thereof, forming a chamber of the interior of the nipple which is sealed from the atmosphere, and circulating vaporized sulfur chloride in the chamber.

7. A method of manufacturing rubber nipples that comprises forming the nipple, curing the exterior thereof, forming a chamber of the interior of the nipple which is sealed from the atmosphere, and circulating a mixture of dry air and vaporized sulfur chloride in the chamber.

8. Apparatus for manufacturing rubber nipples comprising a heating chamber, conduits communicating therewith, and means for supporting nipples over the conduits.

9. Apparatus for manufacturing rubber nipples comprising a heating chamber, conduits communicating therewith, means for supporting nipples over the conduits, and means for effecting circulation of a fluid in the heating chamber and nipples.

10. Apparatus for manufacturing rubber nipples comprising a heating chamber, means for vaporizing a vulcanizing agent, conduits communicating with the chamber, means for supporting nipples over the conduits, and means for effecting circulation of the vaporized vulcanizing agent.

11. Apparatus for manufacturing rubber nipples comprising a heating chamber, a plurality of aluminum plates disposed to form one wall of the chamber and provided with alined openings, a plurality of pipes fitted into the openings of the plates, means for vaporizing a vulcanizing agent in the chamber, means for effecting a circulation of the vapors, and means for exhausting the vapors from the chamber.

In witness whereof, I have hereunto signed my name in the presence of two subscribing witnesses.

ROY SANDERSON.

Witnesses:
 WM. C. McCoy,
 PHILIP E. BARNES.